Patented Sept. 10, 1940

2,214,629

UNITED STATES PATENT OFFICE

2,214,629

PRODUCTS FOR FIXING TANNING AGENTS AND A METHOD OF CARRYING OUT THIS FIXING

Arthur Voss and Walter Pense, Frankfort-on-the-Main-Hochst, Germany, assignors, by mesne assignments, to General Aniline & Film Corporation, New York, N. Y., a corporation of Delaware No Drawing. Application July 28, 1938, Serial No. 221,792. In Germany August 6, 1937

5 Claims.  (Cl. 149—6)

The present invention relates to products for fixing tanning agents and to a method for carrying out this fixing.

Various substances, mostly of a basic character, are known which are capable of fixing tanning agents, and especially tanning agents which have but little tanning action, in the tanned material. When such a substance is used, the tanning agent deposited in the leather is not subsequently redissolved when the leather is rinsed or otherwise treated with water. The fixing agents hitherto known, however, have, in most cases, certain drawbacks. Particularly their fixing power is in general not sufficient.

Now we have found that quaternary ammonium bases obtainable by condensing about 2 mols of a tertiary base with about 1 mol of an aliphatic or aromatic compound containing 2 halogen atoms capable of exchange are especially suitable for fixing tanning agents. Compounds with halogen atoms readily capable of exchange are, for instance, symmetrical dichloroketones or dibromketones such as dichloracetone, dichlorodiethylketone, in which the two chlorine atoms are adjacent to the carbonyl group, halogenated ethers such as dichlorodiethyl ether, dichlorhydrins such as propylene dichlorhydrin or butylene dichlorhydrin, chloracetic acid chlorethyl ester, chloracetic acid chlormethyl ester, or chloracetic acid chloropropyl ester, α-chloropropionic acid chlorethyl ester, chloro-fatty acid esters of polyhydric alcohols with at least two chloro-fatty acid radicals such as glycol dichloracetate or glycerol dichloracetate; furthermore, compounds repeatedly halogenated in a side chain, aromatic compounds with more than one chlorinated alkyl group, also 9:10-dichloranthracene and other dihalogen-derivatives of an aromatic nature as well as all corresponding bromo-compounds or iodo-compounds.

Halogen atoms which are easily exchanged are those which may be exchanged for nitrogenous residues at temperatures between room temperature and about 100° C. Preferably the 2 halogen atoms are attached to 2 different carbon atoms.

Of particular importance as starting materials are the products obtainable by causing about 2 mols of a tertiary amine to act upon about 1 mol of an aromatic compound containing at least two groups of the formula —CH$_2$X, X standing for halogen. Such products are, for instance, those of the reaction with formaldehyde and hydrochloric acid at temperatures of about 0° C. and about 20° C. upon mononuclear or binuclear aromatic compounds for instance hydrocarbons, such as toluene, the xylenes, naphthalene, the methylnaphthalenes; phenols, for instance phenol, the cresols, naphthol; furthermore phenolethers, for instance anisol, phenetol. The products obtainable from these starting materials by action of formaldehyde and hydrochloric acid comprise two groups of the formula —CH$_2$X, X standing for halogen. The preparation of these products is known.

As tertiary bases there may for instance be used trimethylamine, triethylamine, tripropylamine, triethanolamine, dimethylcyclohexylamine, diethylcyclohexylamine, N-methylpiperidine, N-ethylpiperidine, dimethylaniline, diethylaniline, pyridine, quinoline, quinaldine.

The reaction with tertiary bases probably occurs in such a manner that bodies with more than one quaternary nitrogen atom are produced. The reaction may be carried out at temperatures between room temperature and about 100° C. Completion of the reaction can be recognized by the complete solubility of the product in water.

The new bodies differ, therefore, from those hitherto known for the purpose of fixing tanning agents by a complicated composition and by the large size of the molecule, which probably determine the degree of the fixing effect. The products are obtained in the form of their water-soluble hydrogen halides, from which the free bases may be separated by the addition of alkalies.

The method of fixing tanning agents in tanned leathers is known. When the above described agents are used, the method is that already known, for instance the treatment of the leather containing much tanning agent with an aqueous solution of the fixing agent the quantity of which may amount to about 0.5 to 1.5 per cent calculated on the weight of the dry or slightly moist leather. The treatment is carried out at room temperature.

The following examples serve to illustrate the invention, but they are not intended to limit it thereto; the parts are by weight:

1. 130 parts of symmetrical dichloracetone are diluted with 100 parts of benzene; 200 parts of symmetrical triethanolamine are then caused to run into the mixture, while stirring. After the solution has been kept boiling for half an hour, it is freed from the volatile portions by an after-treatment under reduced pressure. The residue is soluble in water.

Instead of dichloracetone there may be used the equivalent quantity of dibromacetone.

Tanned leather may be treated with an aqueous solution of this product at room temperature for the purpose of fixing the tanning agent.

2. 145 parts of β-β-dichlorodiethyl ether are mixed with 160 parts of pyridine while well stirring and externally cooling the vessel. The two components are mixed by causing them to run slowly and uniformly into a vessel. The reaction occurs at once with evolution of heat and is terminated by a subsequent heating for one hour to 50° C. Volatile portions which may not have been caused to react are eliminated by an after-treatment under reduced pressure. The pyridinium base produced remains, after cooling, in the form of a colorless, vitreous block. It is readily soluble in water and may be used in this form directly as a fixing agent as stated in Example 1 after having been diluted in a suitable manner.

3. 130 parts of dichlorhydrin of glycerine are mixed at ordinary temperature, while stirring, with a solution of 240 parts of dimethylaniline in 100 parts of benzene. After all the dichlorhydrin has been introduced, the solution is kept boiling for 20 minutes and the benzene and small portions of volatile substances which have not been caused to react are then distilled under reduced pressure. The residue is a vitreous mass similar to that of the preceding example and having the same solubility. The mass can likewise be used for fixing purposes according to Example 1.

4. 100 parts of a twice chloromethylated meta-xylene obtained by the reaction of meta-xylene with a large excess of a mixture of formaldehyde and hydrogen chloride are dissolved in 200 parts of benzene, the solution is mixed in a manner similar to that of the preceding example with 80 parts of pyridine and the mixture is kept gently boiling for one hour. The volatile portions are eliminated by blowing in steam. The aqueous solution obtained may be concentrated or may be directly used for fixing a tanning agent in the leather as described in Example 1.

Instead of the dichloromethylated meta-xylene there may be used the corresponding derivative of the mixture sold as commercial xylene.

We claim:

1. In the process of fixing tanning agents in leather the step which comprises treating the tanned leather with an aqueous solution of a compound obtainable by causing a tertiary amine to act upon an organic compound containing at least two halogen atoms readily capable of exchange.

2. In the process of fixing tanning agents in leather the step which comprises treating the tanned leather at room temperature with an aqueous solution of a compound obtainable by causing a tertiary amine to act at temperatures between room temperature and about 100° C. upon an organic compound containing at two different carbon atoms two halogen atoms readily capable of exchange.

3. In the process of fixing tanning agents in leather the step which comprises treating the tanned leather at room temperature with an aqueous solution of a compound obtainable by causing about 2 mols of a tertiary amine to act at temperatures between room temperature and about 100° C. upon about 1 mol of an aromatic compound containing two halogen atoms readily capable of exchange.

4. In the process of fixing tanning agents in leather the step which comprises treating the tanned leather at room temperature with an aqueous solution of a compound obtainable by causing about 2 mols of a tertiary amine to act at temperatures between room temperature and about 100° C. upon about 1 mol of an aromatic compound containing two groups of the formula —CH$_2$X, X standing for halogen.

5. In the process of fixing tanning agents in leather the step which comprises treating the tanned leather at room temperature with an aqueous solution of a compound obtainable by causing about 2 mols of pyridine to act at temperatures between room temperature and about 100° C. upon about 1 mol of meta-xylene, substituted by two —CH$_2$Cl groups.

ARTHUR VOSS.
WALTER PENSE.